(12) United States Patent
Sato et al.

(10) Patent No.: US 7,796,814 B2
(45) Date of Patent: Sep. 14, 2010

(54) IMAGING DEVICE

(75) Inventors: Masaaki Sato, Kanagawa (JP);
Shinichiro Saito, Kanagawa (JP);
Hirotake Cho, Kanagawa (JP)

(73) Assignee: Sony Corporation, Tokyo (JP)

( * ) Notice: Subject to any disclaimer, the term of this patent is extended or adjusted under 35 U.S.C. 154(b) by 825 days.

(21) Appl. No.: 11/734,092

(22) Filed: Apr. 11, 2007

(65) Prior Publication Data
US 2008/0124000 A1 May 29, 2008

(30) Foreign Application Priority Data
Apr. 14, 2006 (JP) .............................. 2006-111634

(51) Int. Cl.
*G06K 9/00* (2006.01)
(52) U.S. Cl. ...................... 382/167; 382/162; 382/300; 358/525; 348/538
(58) Field of Classification Search ................. 382/292, 382/300, 162, 164, 165, 167; 358/428, 525; 345/698, 699; 348/441, 538
See application file for complete search history.

(56) References Cited

U.S. PATENT DOCUMENTS

| 4,962,419 A | * | 10/1990 | Hibbard et al. | ............. | 348/627 |
|---|---|---|---|---|---|
| 6,366,318 B1 | * | 4/2002 | Smith et al. | .................. | 348/272 |
| 7,116,819 B2 | * | 10/2006 | Zhang | ......................... | 382/162 |
| 7,206,022 B2 | * | 4/2007 | Miller et al. | ............ | 348/333.03 |
| 7,324,138 B2 | * | 1/2008 | Yamamoto | ................ | 348/222.1 |

FOREIGN PATENT DOCUMENTS

| JP | 2001-218037 | 8/2001 |
|---|---|---|
| JP | 2001-218073 | 8/2001 |

\* cited by examiner

*Primary Examiner*—Samir A. Ahmed
*Assistant Examiner*—Ali Bayat
(74) *Attorney, Agent, or Firm*—Sonnenschein Nath & Rosenthal LLP

(57) ABSTRACT

An imaging device includes a sensor having a cell layout having a plurality of chromatic color pixels and high-sensitivity pixels having higher sensitivity to incident light than the chromatic color pixels arranged in a checkerboard pattern, a white balance block that normalizes the pixel output from the sensor with respect to the chromatic color pixels or the high-sensitivity pixels, a pixel interpolation block that performs interpolation on the phase where a chromatic color pixel is present by interpolating the other lacking colors, and a noise reduction block that is situated between the white balance block and the pixel interpolation block, and performs interpolation on phases of the chromatic color pixels based on the signal component of the high-sensitivity pixels so as to suppress noise in the chromatic color pixels.

5 Claims, 15 Drawing Sheets (1)

(2)

: AREA WHERE PIXEL IS NOT PRESENT

FIG. 10

INTERPOLATED W PIXEL (Wlpf) IS PRESENT AT POSITION WHERE R PIXEL IS PRESENT

IMAGING DEVICE

CROSS REFERENCES TO RELATED APPLICATIONS

The present invention contains subject matter related to Japanese Patent Application JP 2006-111634 filed in the Japanese Patent Office on Apr. 14, 2006, the entire contents of which being incorporated herein by reference.

BACKGROUND OF THE INVENTION

1. Field of the Invention

The present invention relates to an imaging device in which pixels containing luminance information are arranged.

2. Description of the Related Art

In an image sensor, represented by an image sensor having RGB primary color Bayer layout of related art (see JP-A-2001-218073, for example), when the amplitude of a signal level is small, noise, such as dark current, significantly affects the image quality. Noise reduction may be therefore essential, which however provides a limited effect because of inevitable reduction in the amount of signal due to color filters.

Consequently, there is a need for a noise reduction method for an image sensor in which white (W) pixels are disposed and the layout is inclined 45° to a square.

For example, in a pixel layout used in related art that does not contain W (white) pixels, such as a primary color Bayer layout and a complementary color checkerboard layout, different pixels are used in contour judgment according to whether the portion to be imaged is colored (chromatic color) or not colored (achromatic color), even for subjects having the same luminance. In many cases, there have been devised signal processing in which edge detection, correlation detection and the like is carried out with reference to pixels having "green" components that are primarily responsible for the visual sensitivity characteristic. However, when the subject contains no green signal component or the ratio of the green signal component is low, the performance is significantly degraded or the signal processing itself will not work.

On the other hand, a pixel layout containing W pixels has a high component ratio of W pixels, that is, the number of W pixels is the same as those of color pixels (two to four times the number of each of individual colors that have undergone color separation), and provides a detection signal with a small amount of noise components, so that such a pixel layout is suitable for edge detection, correlation detection and the like. In contrast, the number of pixels that can be used to judge colors is small, causing a problem of difficulty in color reproduction.

SUMMARY OF THE INVENTION

A problem to be solved is that inevitable reduction in the amount of signal due to color filters leads to significant impact of noise, such as dark current, on the image quality, particularly when the amplitude of a signal level is small. Another problem to be solved is that a pixel layout containing W pixels that provides a detection signal with a small amount of noise components has less impact of noise, but has difficulty in color reproduction because of a small number of pixels that can be used to judge colors.

It is desirable to perform interpolation on phases of color pixels based on signal components of white pixels so as to suppress noise in color images to a level similar to that of white pixels.

According to an embodiment of the invention, there is provided an imaging device including a sensor having a cell layout having a plurality of chromatic color pixels and high-sensitivity pixels having higher sensitivity to incident light than the chromatic color pixels arranged in a checkerboard pattern, a white balance block that normalizes the pixel output from the sensor with respect to the chromatic color pixels or the high-sensitivity pixels, a pixel interpolation block that performs interpolation on the phase where a chromatic color pixel is present by interpolating the other lacking colors, and a noise reduction block that is situated between the white balance block and the pixel interpolation block, and performs interpolation on phases of the chromatic color pixels based on the signal component of the high-sensitivity pixels so as to suppress noise in the chromatic color pixels.

In an embodiment of the invention, the noise reduction block is provided between the white balance block and the pixel interpolation block and the noise reduction block performs interpolation on phases of the chromatic color pixels based on the signal component of the high-sensitivity pixels so as to suppress noise in the chromatic color pixels, it is possible to ensure color reproducibility and suppress noise in the chromatic color image to a level similar to that of the high-sensitivity pixels. Furthermore, use of the high-sensitivity pixels allows noise reduction at low illuminance and improvement in sensitivity.

According to an embodiment of the invention, it is possible to ensure color reproducibility and suppress noise in a chromatic color image to a level similar to that of the high-sensitivity pixels, and use of the high-sensitivity pixels allows noise reduction at low illuminance and improvement in sensitivity. Thus, an image can be obtained from a dark subject in a high sensitivity condition, so that a high-sensitivity, noise-suppressed, high-image quality imaging result is advantageously obtained. Particularly, in a dark portion of an image or a low-illuminance image, even when the image is processed such that high gain is applied to the sensor output, colors are reconstructed with reference to the high-sensitivity pixels having relatively low noise, such as W (white) pixels, allowing noise of the color image to be reduced to the level similar to that of the high-sensitivity pixels. Information from the high-sensitivity pixels that are advantageous in terms of transmission spectral characteristic compared to RGB is thus positively used, allowing an enhanced effect of noise reduction.

BRIEF DESCRIPTION OF THE DRAWINGS

FIG. 10 is a pixel layout diagram showing an example of noise reduction on R pixels;

DESCRIPTION OF THE PREFERRED EMBODIMENTS

The imaging device according to an embodiment (first example) of the invention will be described below with reference to FIGS. 1 to 4.

Figure 3:
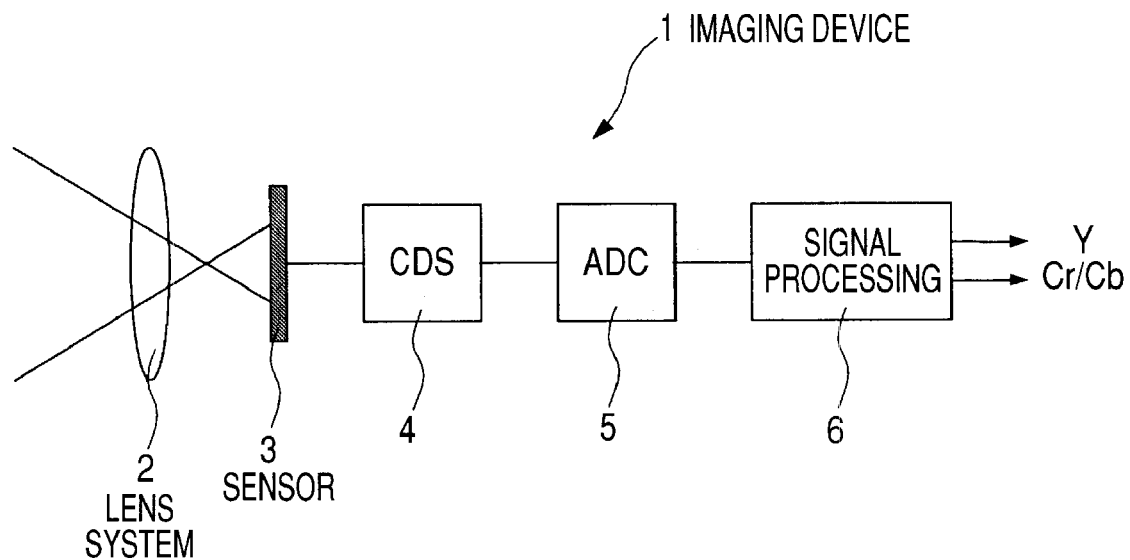
FIG. 3 is a block diagram showing an example of the imaging device to which the invention is applied.

Firstly, an example of the imaging device to which the invention is applied will be described with reference to the block diagram of FIG. 3. FIG. 3 shows an entire camera system using an image sensor, by way of example.

As shown in FIG. 3, the imaging device 1 includes a lens system 2 for focusing an image, a sensor 3 having pixels for photoelectric conversion, a correlated double sampling (CDS) portion 4 that receives the electric signal, removes 1/f noise and extracts only a signal component, an analog-to-digital converter (ADC) 5 that converts the pixel signal from the sensor, which is an analog signal, into a digital signal, and a signal processing block 6 that outputs the digitized sensor signal as a final image signal.

In the imaging device 1, an image focused by the lens system 2 is imaged onto the pixels of the sensor 3 and outputted to the CDS portion 4 as an electric signal. The CDS portion 4 removes 1/f noise and extracts only a signal component. Then, the ADC 5 converts the pixel signal from the sensor, which is an analog signal, into a digital signal. The digitized sensor signal is then inputted to the signal processing block 6 and processed into a final image signal.

Next, an example of color layout in the sensor 3 of the imaging device 1 according to this embodiment of the invention will be described with reference to FIG. 4.

Figure 4:
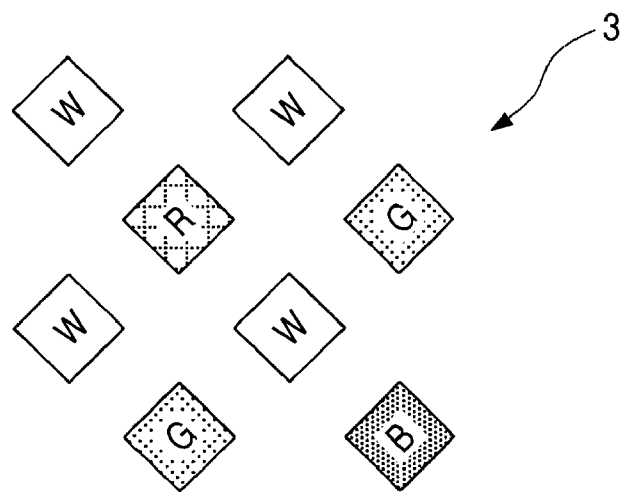
FIG. 4 is a pixel layout diagram showing an example of color layout of a sensor in the imaging device.

As shown in FIG. 4, in the pixel layout of the sensor 3, pixels for obtaining luminance information (in this example, high-sensitivity pixels having higher sensitivity to incident light than chromatic color pixels) are arranged at phase positions having spatial phases shifted by half a cycle with respect to an RGB square Bayer pixel layout of related art. The high-sensitivity pixels are formed of, for example white pixels or gray pixels. The figure shows an example where white pixels are arranged. The following description will be made with reference to an example where white (W) pixels are arranged.

Figure 1:
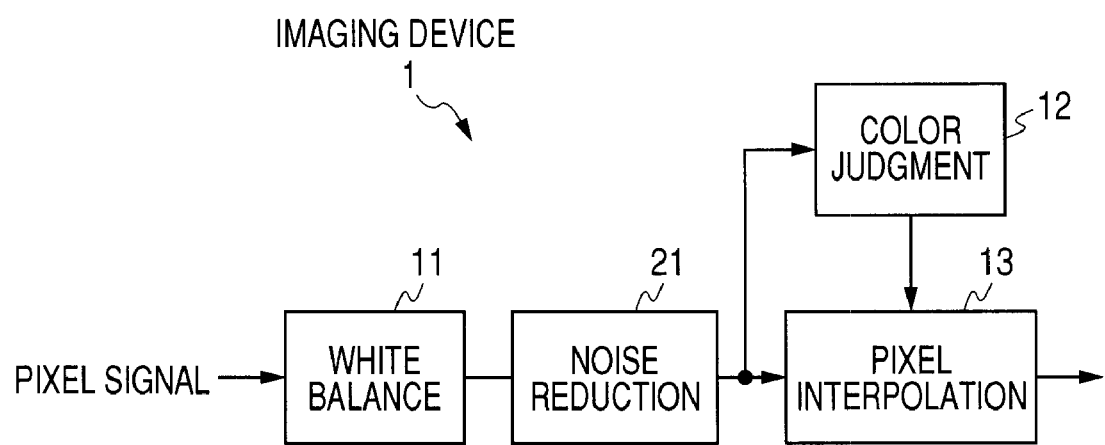
FIG. 1 is a block diagram showing the main feature of the imaging device according to an embodiment (first example) of the invention.
Figure 2:
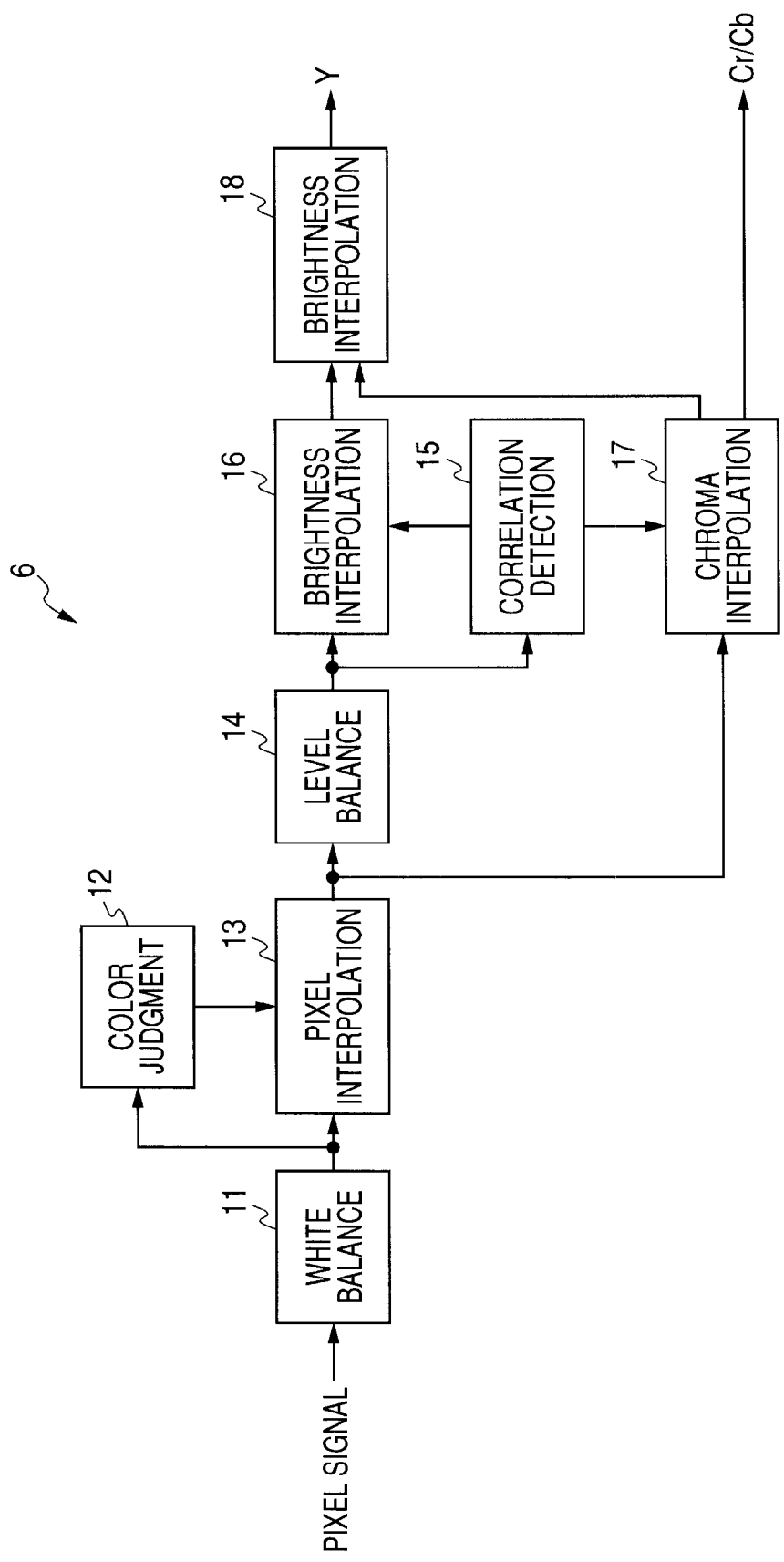
FIG. 2 is a block diagram showing an example of the details of a signal processing block.

The main feature of the invention will now be described with reference to FIGS. 1 and 2. FIG. 2 is a block diagram showing the details of the signal processing block 6. FIG. 1 is a block diagram showing the details of the signal processor after a noise reduction block that carries out noise reduction is inserted.

As shown in FIG. 2, the pixel signal from the sensor that has been converted into the digital signal by the analog-to-digital converter (ADC) is inputted to a white balance block 11, where the pixel output from the sensor is normalized with respect to G (Green) pixels, which are the chromatic color pixels, or W pixels, which are the high-sensitivity pixels.

The normalized signal is inputted to a color judgment block 12 and a pixel interpolation block 13 independent of each other. The color judgment block 12 judges whether or not the pixel of interest and the surrounding pixels are chromatic color pixels and sends the result to the pixel interpolation block 13.

The pixel interpolation block 13 performs interpolation on the phase where one of R/G/B pixels, which are chromatic color pixels, is present by interpolating two lacking colors. For example, B/R pixels are used for interpolation on the position where a G pixel is present. The pixel interpolation block 13 uses the judgment result of the color judgment block 12 to dynamically change the interpolation process. When the pixel of interest is not a chromatic color pixel, the pixel signal from the pixel of interest is positively used to improve the resolution when pixels to be used for interpolation are generated, while when the pixel of interest is a chromatic color pixel, signals from the surrounding pixels having the same colors as those of pixels to be used for interpolation are interpolated.

The process after the pixel interpolation is divided into two lines, that is, luminance generation and chrominance generation. The process line of luminance generation will be first described.

The R/G/B pixel signals generated in the pixel interpolation block 13 undergo a conversion process, such as an NTSC luminance conversion equation as a representative example, so as to generate a Y signal. Since the generated Y signal and the W pixels do not match with each other in terms of signal level, level matching is carried out in a level balance block 14. The level balance block 14 generates a (high-frequency) luminance signal in which the level of the W signal is the same as that of the Y signal.

However, since a pixel having a luminance signal and a pixel having no luminance signal are spatially disposed and alternately appear (½ in terms of spatial phase), the phase where no pixel is present is complemented by a pixel. This complementation is carried out in a luminance interpolation block 16. Judgment of this complementation process is carried out in a correlation detection block 15. The correlation detection block 15 carries out this process by using the luminance signal as a detection signal. The detection result is used both in the luminance generation and the chrominance generation.

In a chrominance interpolation block 17, R/G/B pixels are first used for interpolation on the phase where a W pixel is present. The interpolation is calculated, for example, by computing the ratio of the surrounding W pixels to R/G/B pixels. Furthermore, to perform pixel complementation on the phase where no R/G/B pixel is spatially present, the detection result of the correlation detection block 15, which has been described in the luminance generation, is reflected for pixel complementation.

A luminance interpolation block 18 is a block that recombines the high-frequency luminance signal and the R/G/B signals computed in the chrominance generation process to generate a low-frequency Y luminance signal. This process suppresses degradation in luminance reproducibility at low frequencies.

Y/Cr/Cb signals are thus generated and the pixel interpolation process is completed.

The above description is the summary of image processing performed in the image sensor having the pixel layout shown in FIG. 4. In the imaging device according to this embodiment of the invention, a noise reduction block 21 is provided between the white balance block 11 and the pixel interpolation block 13/color judgment block 12, as shown in FIG. 1. The noise reduction block 21 performs noise suppression on signals Wwb, Rwb, Gwb and Bwb obtained in the white balance block 11 by normalizing pixel outputs from the sensor with respect to W pixels and R/G/B pixels, respectively.

The details of the noise reduction block 21 will now be described with reference to the block diagram of FIG. 5.

Figure 5:
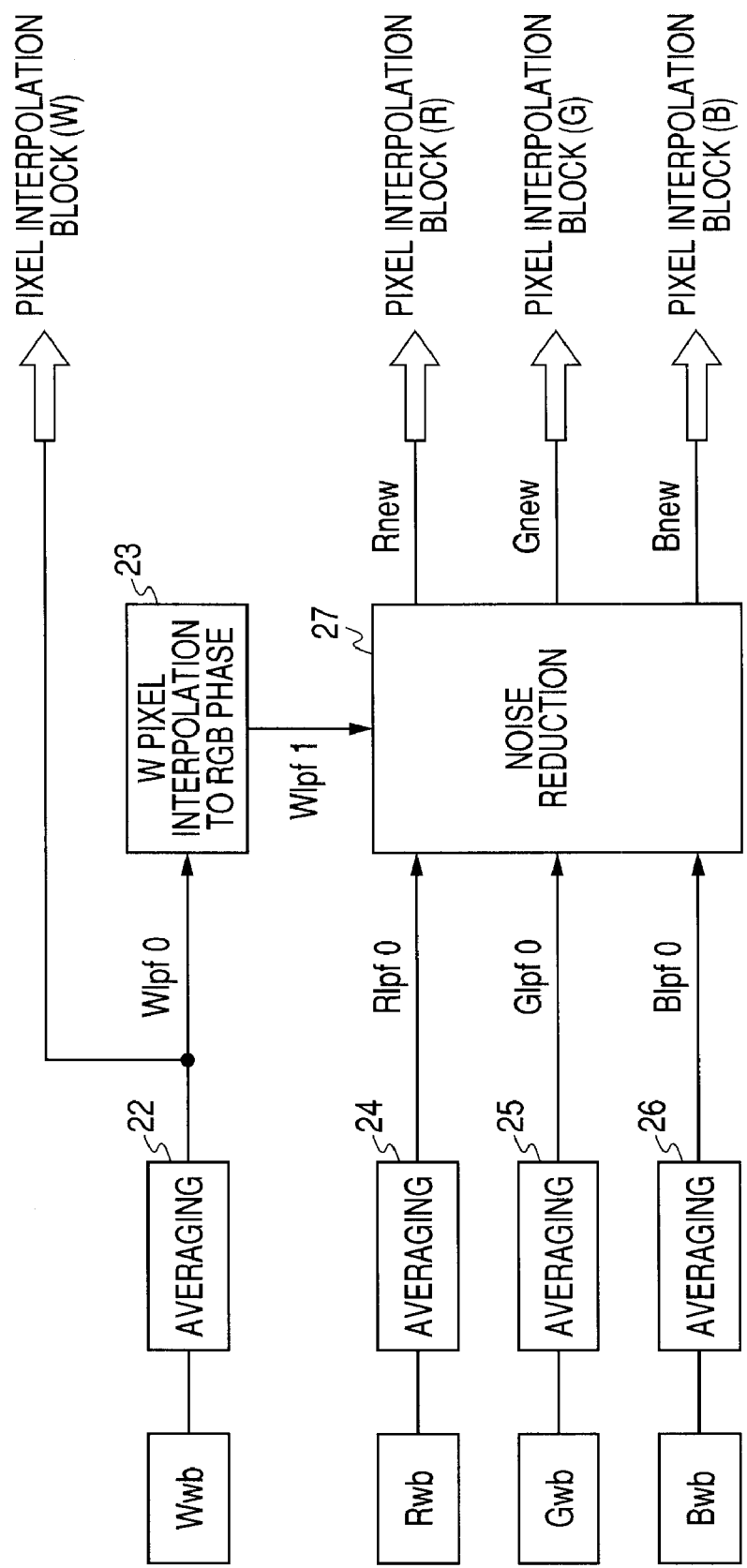
FIG. 5 is a block diagram showing an example of the details of a noise reduction block.

As shown in FIG. 5, four signals Wwb, Rwb, Gwb and Bwb are used as input signals. Wwb denotes a W pixel signal after the white balance operation. Similarly, Rwb denotes an R pixel signal after the white balance operation, Gwb denotes a G pixel signal after the white balance operation, and Bwb denotes a B pixel signal after the white balance operation.

Figure 6:
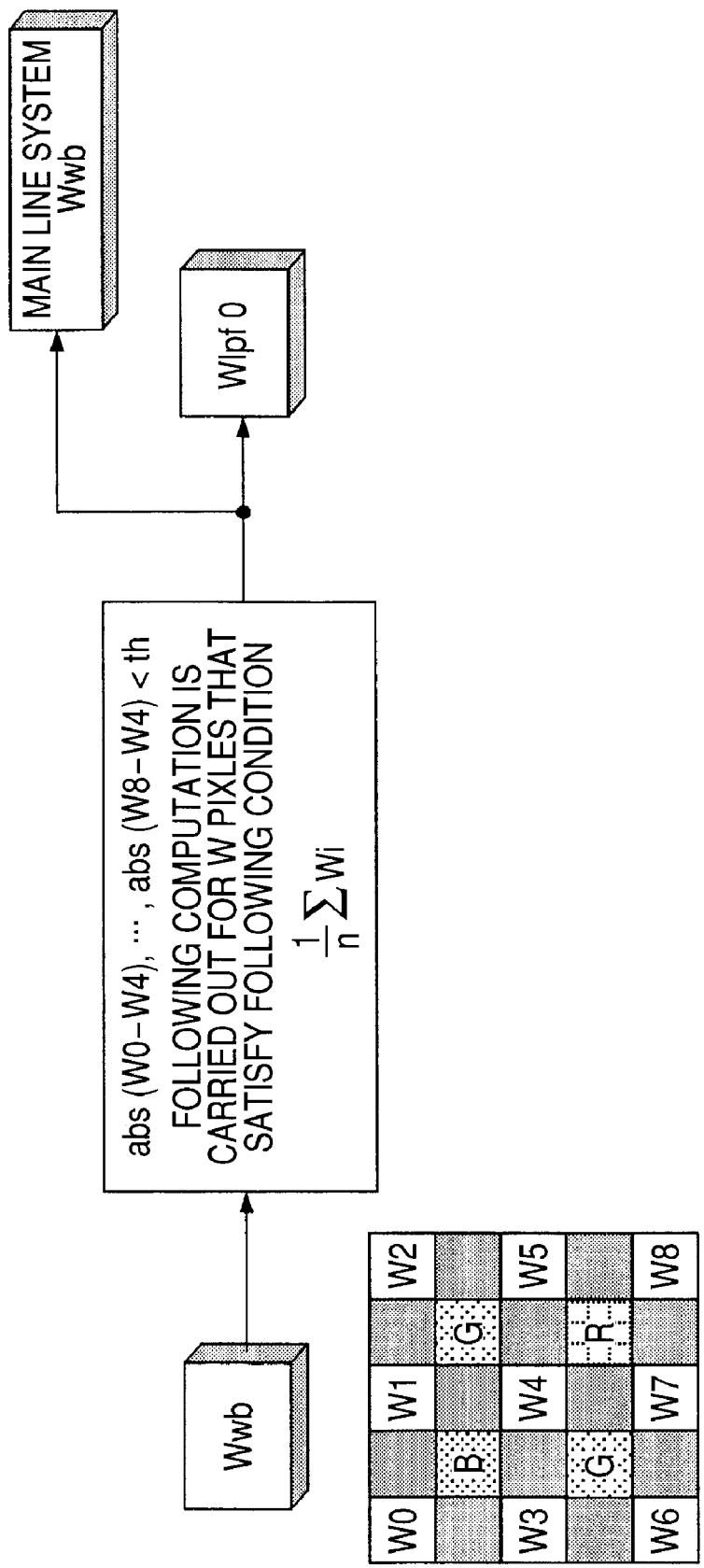
FIG. 6 shows an algorithm illustrating an example of W pixel averaging.

Firstly, an averaging block 22 performs averaging on W pixels. FIG. 6 shows an algorithm for the W pixel averaging in detail.

As shown in FIG. 6, in this example, W pixels in a 3×3 area undergo the averaging process. The area used in the averaging can be arbitrarily selected as necessary.

The purpose of the averaging of W pixels is to process pixel information having inherently good S/N so as to further improve the S/N. The averaging process creates a new W pixel at the position of the pixel W4. In this process, since simple averaging may disadvantageously remove high-frequency components, such as an edge, absolute values of difference between the pixel W4 and the surrounding pixels W0 to W8, abs(W0-W4), ..., abs(W8-W4) are evaluated and compared with a threshold value th. That is, the following equation is evaluated.

$$abs(W0-W4), \ldots, abs(W8-W4) < th$$

The threshold value th sets a value for selecting a range including the same level as that of the pixel W4.

The above computation determines W pixels that satisfy the condition. All such W pixels are summed to determine the average. The new W pixel is thus generated. That is, the following equation is evaluated.

$$(1/n)\Sigma W_i$$

Figure 7:
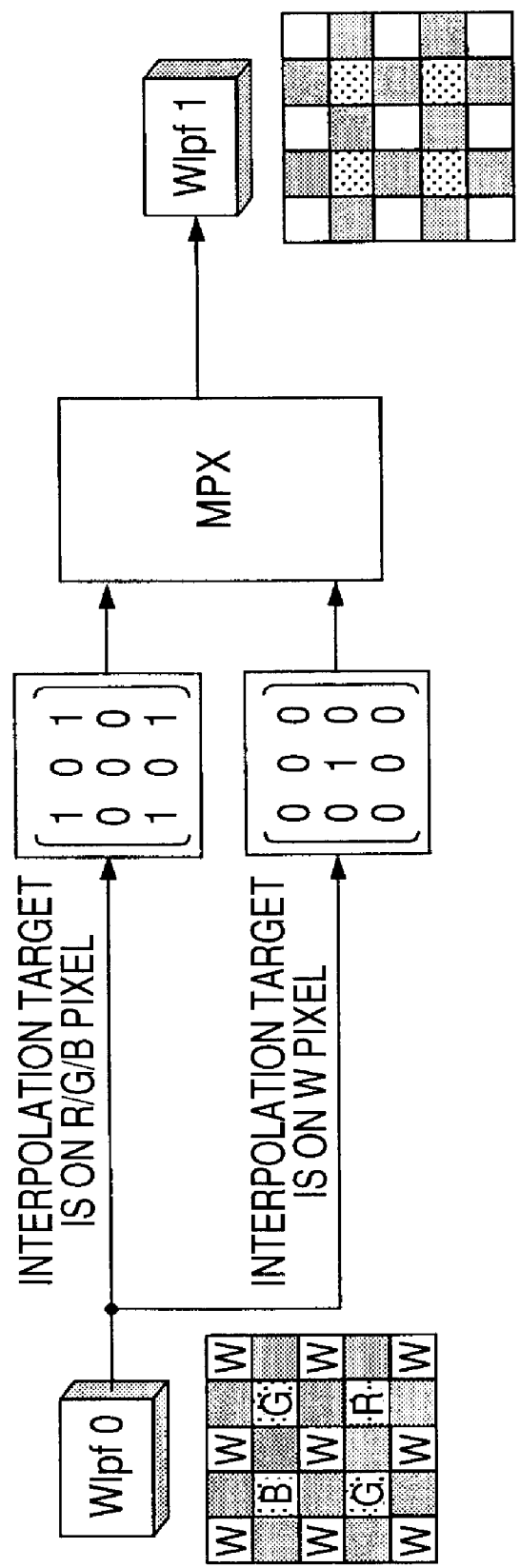
FIG. 7 shows an algorithm illustrating an example of pixel interpolation.

Subsequently, returning to FIG. 5, in a pixel interpolator 23, the W pixel is used for interpolation on the phase where the RGB pixels are present. This interpolation is carried out using the algorithm shown in FIG. 7, by way of example. The purpose of the interpolation in this process is to generate a detection signal Wlpf1 that will be used in noise reduction, which will be described later, so that the interpolation may not necessarily be carried out in an exactly accurate manner.

Figure 8:
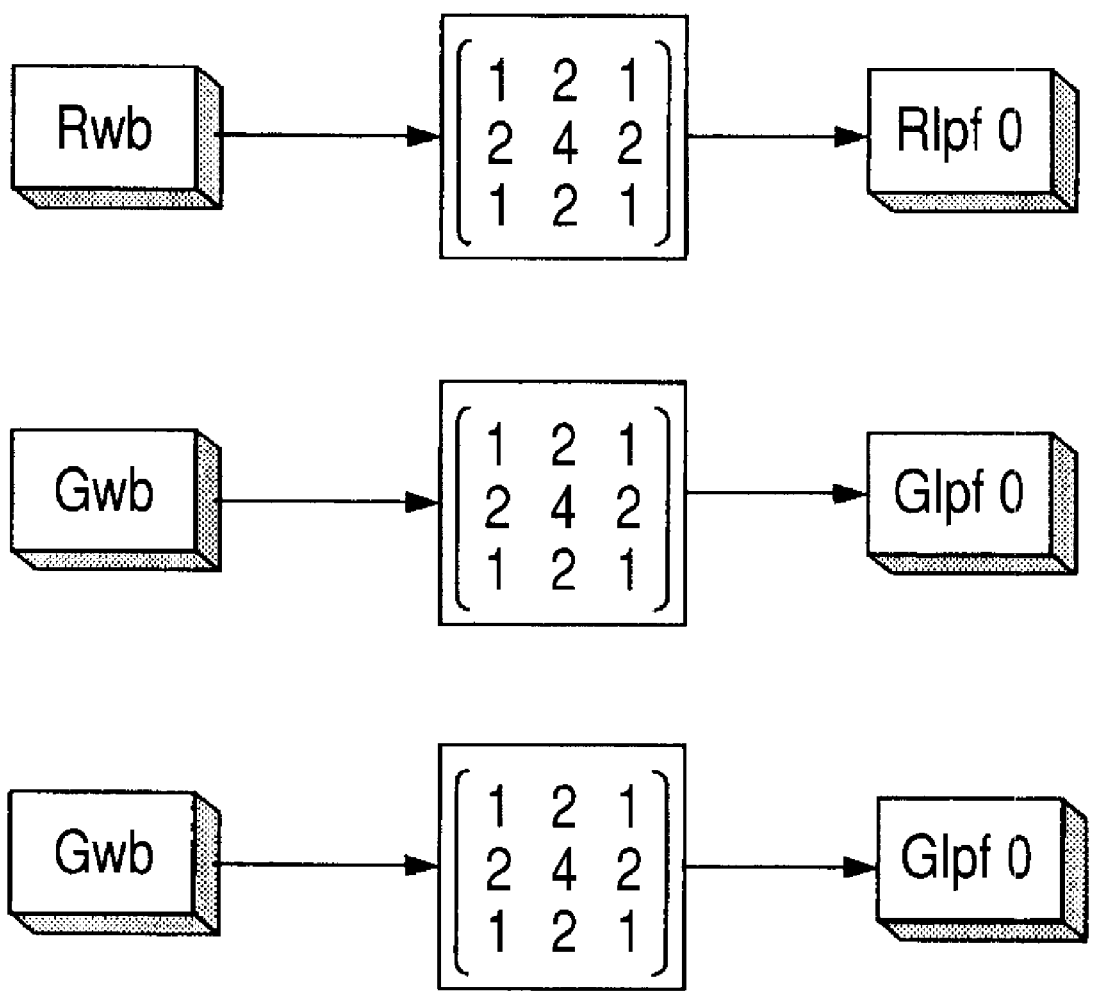
FIG. 8 shows an algorithm illustrating an example of averaging.

On the other hand, averaging blocks 24, 25 and 26 average RGB pixel signals Rwb, Gwb and Bwb. FIG. 8 shows an example of this averaging process. Averaging using the algorithm shown in FIG. 8 is applied to the signals Rwb, Gwb and Bwb so as to obtain detection signals Rlpf0, Glpf0 and Blpf0. The purpose of this process is to prevent false colors at high frequencies.

The pixels generated in the above process are adapted to noise reduction in a noise reduction section 27.

Figure 9:
FIG. 9 shows pixel layout diagrams illustrating an example of noise reduction on R pixels.

Next, following the notational conventions indicated in FIGS. 9 and 10, noise reduction on R pixels will be shown by way of example.

As shown in (1) in FIG. 9, the pixel layout shown in FIG. 4 is replaced with a square layout. Considering R pixels as pixels of interest, the square layout is rewritten as shown in (2) in FIG. 9. Similarly, considering a 5×5 R pixel area as pixels of interest, the layout shown in (2) in FIG. 9 is rewritten as shown in FIG. 10. This area of interest is a process unit for noise reduction. Noise reduction will now be described, considering R12 in FIG. 10 as the pixel of interest. Although only R pixels are labeled in FIG. 10, a W pixel is also present at the phase where an R pixel is present after the above interpolation.

In the noise reduction, W pixels are first used to judge the coverage of noise reduction. Specifically, the difference between the pixel of interest (W12) and each of the surrounding pixels is determined. In this process, a noise level threshold value th is specified, and summation of the W pixel values and summation of the R pixel values is carried out over the positions where the difference is smaller than th. That is, the following equation is evaluated.

$$abs(W0-W12), abs(W1-W12), abs(W2-W12) \ldots, abs(W24-W12) < \text{threshold value } th$$

where Wsum is the sum of W pixel values that satisfy the above condition, and Rsum is the sum of R pixel values that satisfy the above condition.

Subsequently, the following equation is used to calculate an R pixel value (R12new) to be used for interpolation on R12, and the result is sent to an RGB interpolation block in the main-line process.

$$R12new = (W12/Wsum) \times Rsum$$

Similarly, by performing similar computation on G pixels and B pixels, a noise-suppressed signal can be generated.

Figure 11:
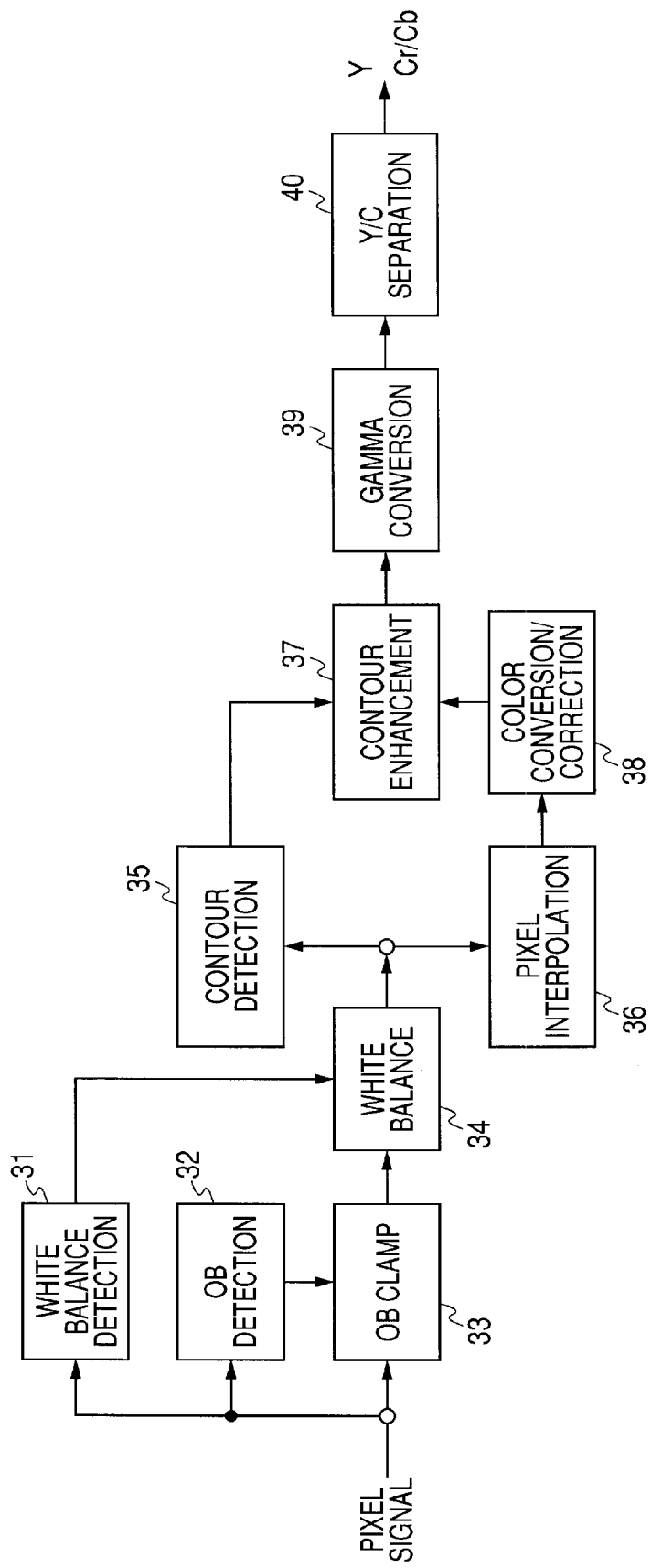
FIG. 11 is a block diagram showing an example of the details of a signal processing block of the imaging device according to another embodiment (second example) of the invention.

Next, the imaging device according to another embodiment (second example) of the invention will be described with reference to FIGS. 11 to 16. FIG. 11 shows the details of the signal processing block shown in FIG. 3.

As shown in FIG. 11, the pixel signal from the sensor that has been converted into a digital signal by the analog-to-digital converter (ADC) is inputted to "white balance detection" 31, "optical black detection (OB detection)" 32 and "optical black correction (OB clamp)" 33 independent of each other. Then, "white balance" 34 is used to normalize the pixel output from the sensor with respect to G (Green) pixels, which are chromatic color pixels, or W pixels, which are high-sensitivity pixels.

The normalized signal is inputted to "contour detection" 35 and "pixel interpolation" 36 independent of each other. The "contour detection" 35 judges the contour of the image and transmits the result to "contour enhancement" 37. The "pixel interpolation" 36 receives the signal after white balance adjustment as an input signal to divide the inputted pixel signal into the colors of chromatic color pixels (color pixels) and high-sensitivity pixels (white (W) pixels, for example). Based on the W image resulting from the color separation, the area to which signal interpolation is applied is determined and interpolation of W pixels are carried out on color pixels where no W pixel is present. Based on the result of the interpolation of W pixels and the area to which signal interpolation is applied, for example, a surface where the white signal level has a similar tendency, for example, corresponding to similar luminance within about ±10%, is detected, and interpolation of chromatic color pixels are carried out on a detected plane basis.

After the above "pixel interpolation" 36 is carried out, "color conversion/correction" 38, "contour enhancement" 37, "gamma conversion" 39 and "Y/C separation" 40 is carried out to generate Y/Cr/Cb signals, and the pixel interpolation is completed.

The second example is also a signal processing method based on the assumption that high-sensitivity pixels having higher sensitivity to incident light than chromatic color pixels are used. An example of such a pixel layout has a cell layout in which chromatic color pixels having R/G/B primary color filters and high-sensitivity pixels formed of white pixels or gray pixels are arranged in a checkerboard pattern, as shown in FIG. 12.

Figure 12:
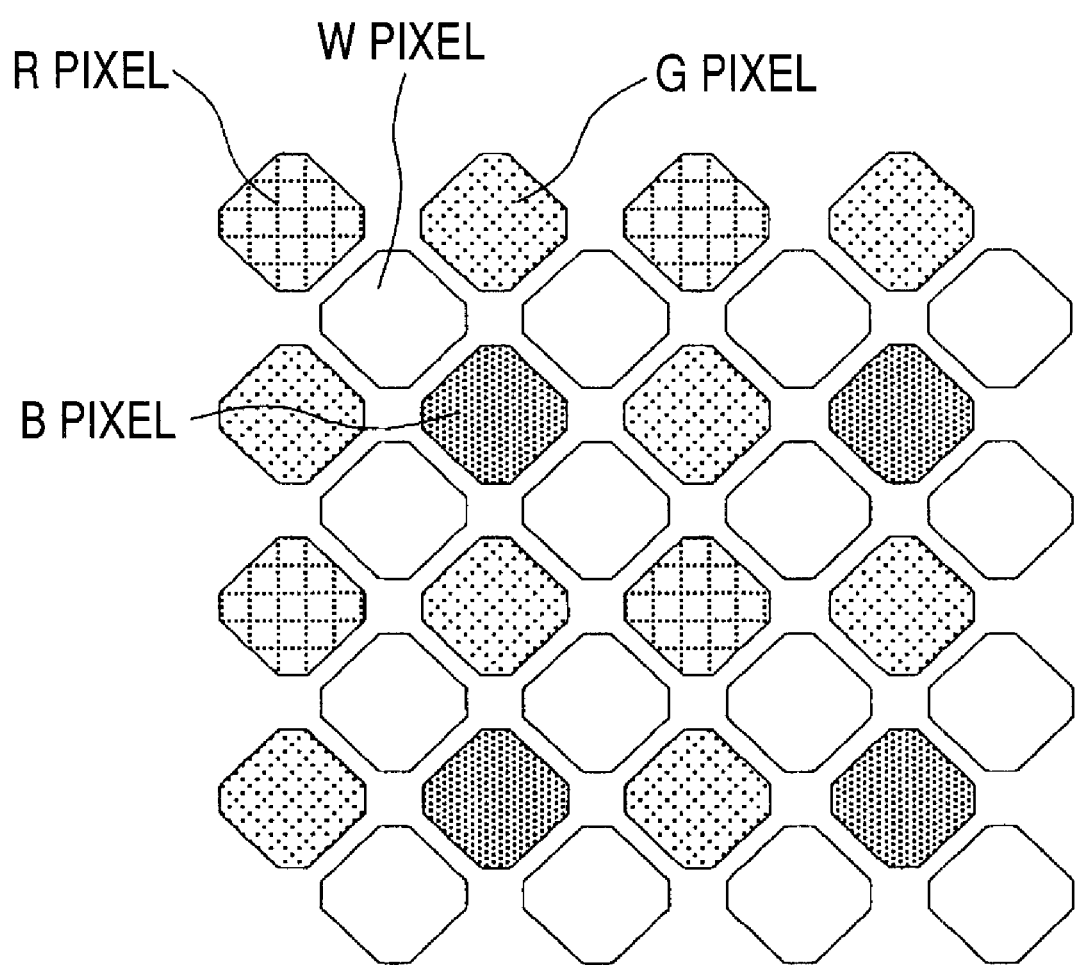
FIG. 12 is a pixel layout diagram showing an example of color layout of a sensor in the imaging device.

Although it is assumed that the pixel layout shown in FIG. 12 is used in this example, the pixel layout is not limited to the chromatic color pixel layout shown in FIG. 12. For example, instead of the pixels having primary color filters shown in the figure, pixels having complementary color signal filters can be used. Alternatively, the layout itself does not need to be the zigzag layout shown in FIG. 12, but a square layout can be applied. Similarly, the number of W (pixels) can also be changed. The filter layout in which one of the two G pixels in the primary color square Bayer layout frequently used in related art is replaced with a W pixel can also be used.

Figure 13:
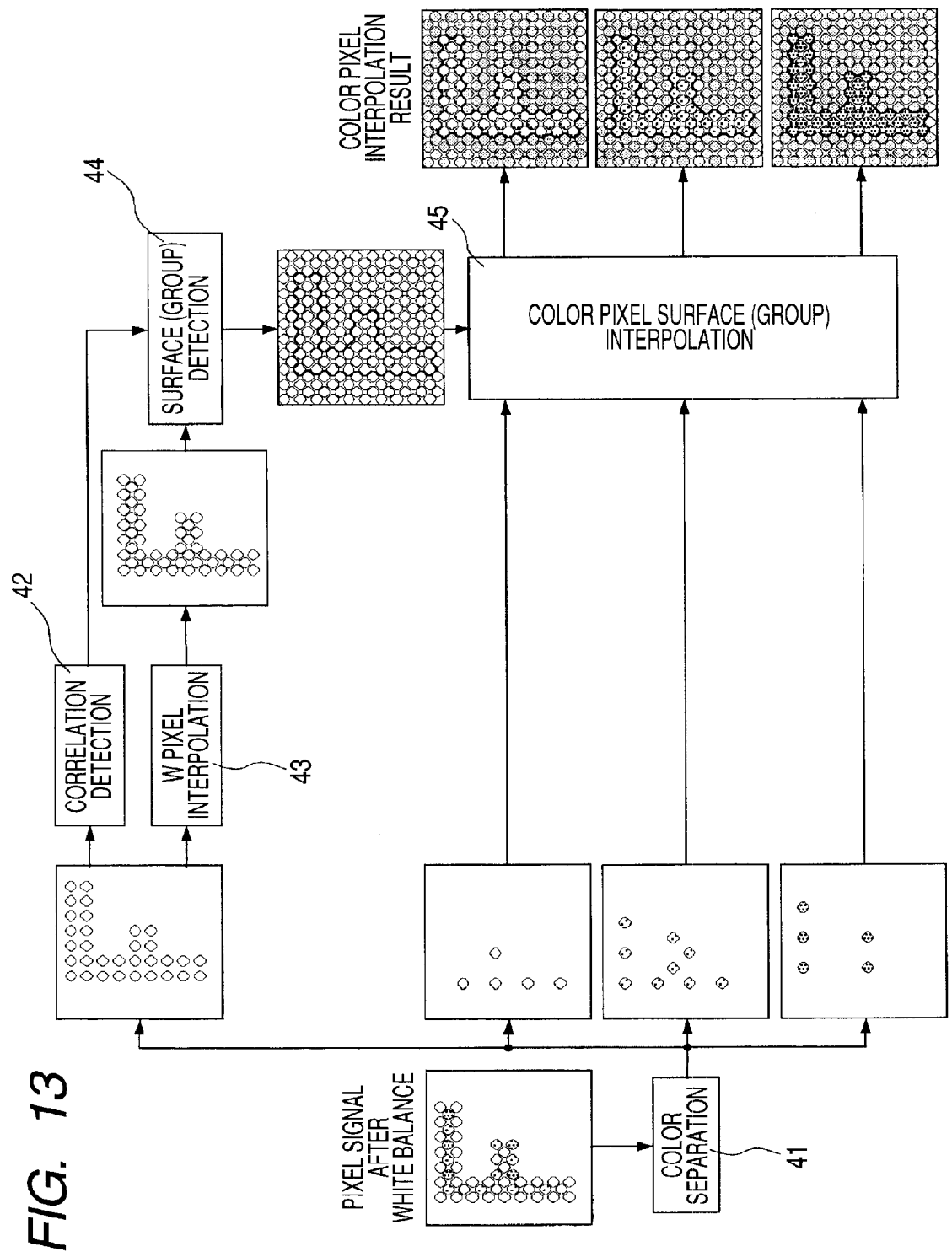
FIG. 13 is a block diagram of pixel interpolation showing the main feature of the imaging device according to the second example of the invention.
Figure 14:
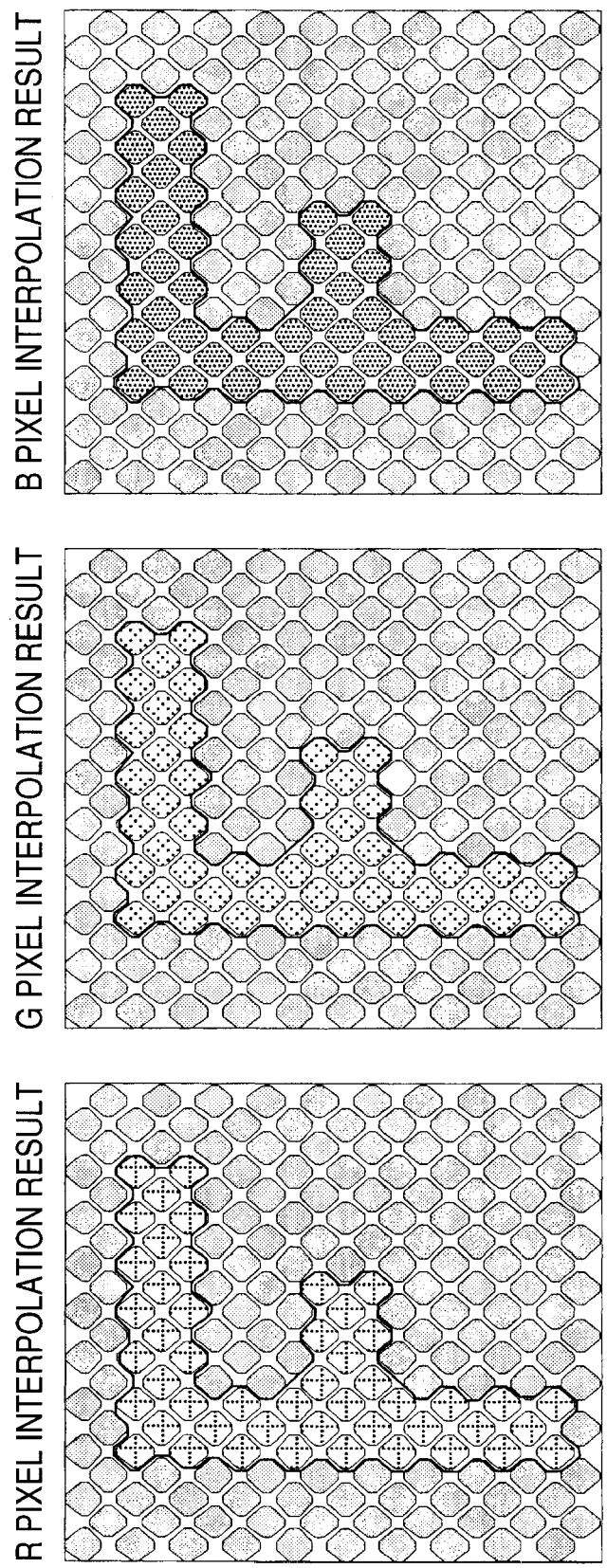
FIG. 14 shows enlarged views illustrating the result of color pixel interpolation.

Next, the details of pixel interpolation of this example (corresponding to the "pixel interpolation" in FIG. 11) will be described with reference to the block diagram of FIG. 13 showing pixel interpolation and an enlarged view of FIG. 14 showing the result of color pixel interpolation.

As shown in FIG. 13, the input signal is the signal after the optical black correction (OB clamp) and the white balance adjustment. This input signal is inputted to "color separation" 41 to divide the inputted pixel signal into color pixels and white (W) pixels. This color separation is carried out, for example, as shown in FIG. 15.

Figure 15:
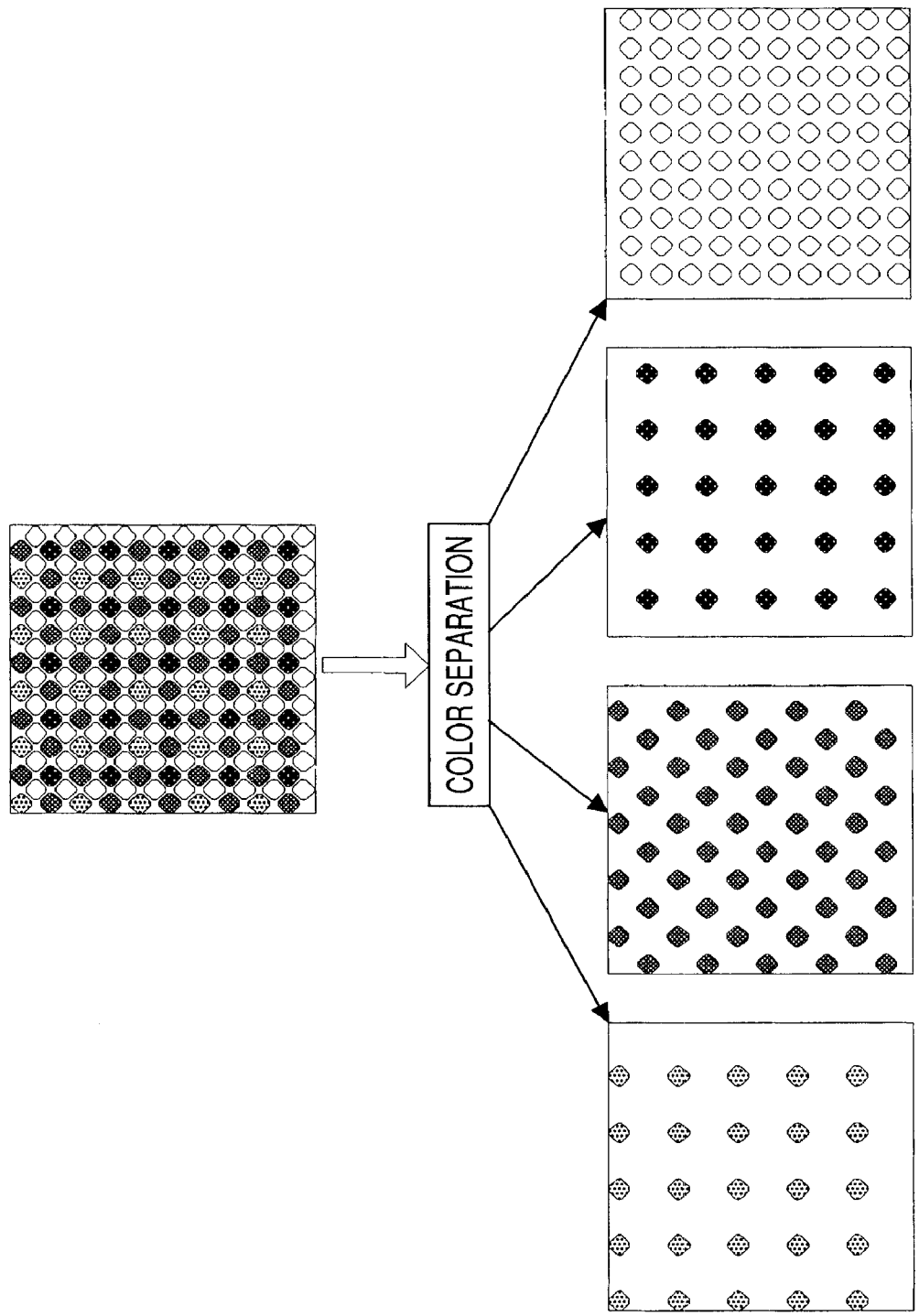
FIG. 15 is a layout diagram showing an example of color separation.

That is, as shown in FIG. 15, for example, R, G, B and W mixed image is divided into respective color images without changing the positions of the pixels. As a result, individual R, G, B and W images are obtained.

Then, "correlation detection" 42 is carried out. In the "correlation detection" 42, an area to which signal interpolation is applied is determined based on the W image resulting from the color separation.

Thereafter, "W pixel interpolation" 43 is carried out. In the "W pixel interpolation" 43, interpolation of W pixels is carried out on color pixels where no W pixel is present based on the result of the correlation detection.

Then, "surface (group) detection" 44 is carried out. In the "surface (group) detection" 44, for example, a surface (group) where the white signal level has a similar tendency, for example, corresponding to similar luminance within about ±10%, is detected based on the result of the interpolation of W pixels and the result of the correlation detection.

Thereafter, "color pixel surface (group) interpolation" 45 is carried out. In the "color pixel surface (group) interpolation" 45, interpolation of color pixels are carried out on a detected surface (group) basis. As a result, interpolation of R, G and B pixels are carried out, as shown in FIG. 14.

Figure 16:
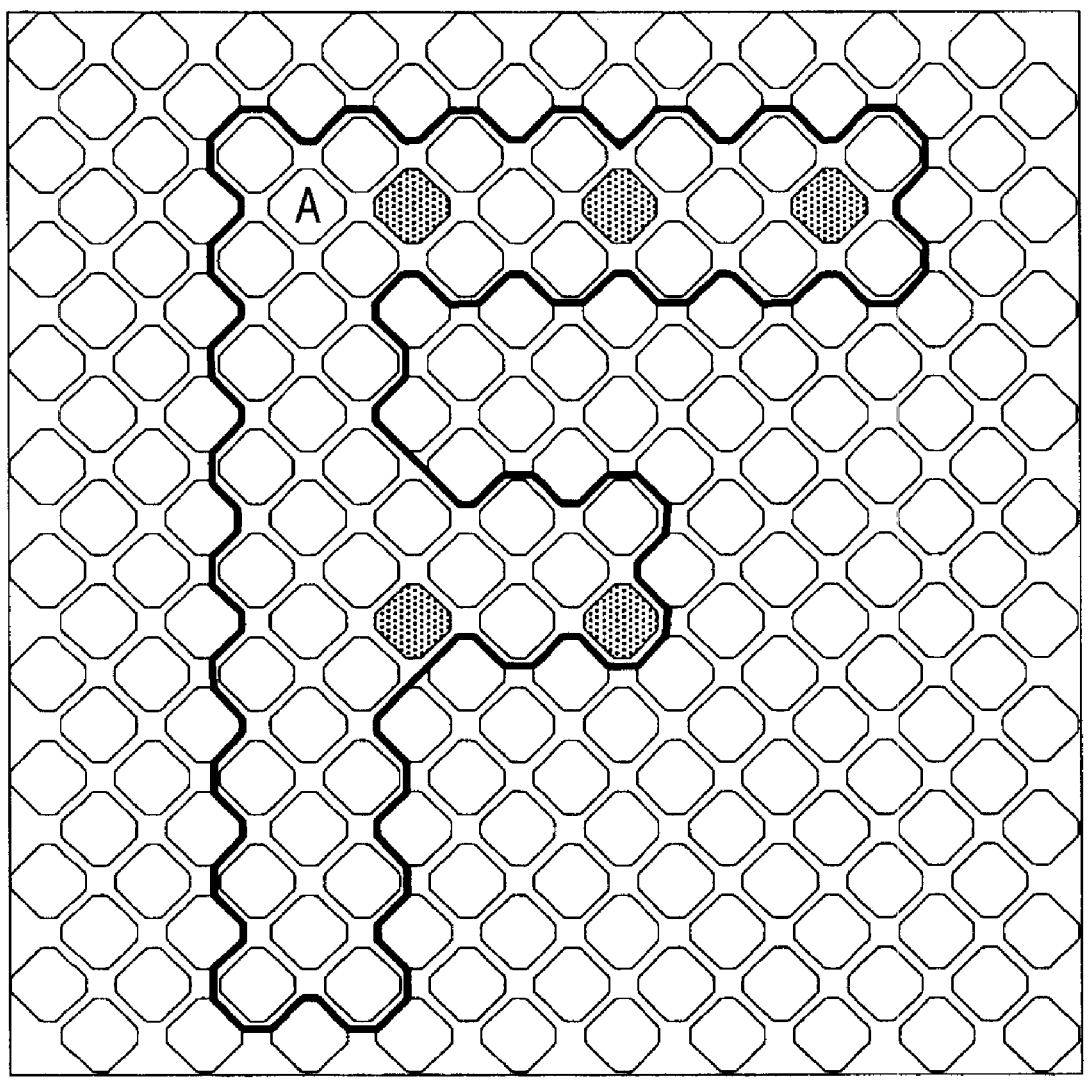
FIG. 16 is a pixel layout diagram for explaining an example of interpolation of a blue pixel.

For example, as shown in FIG. 16, interpolation of a blue pixel on the location labeled "A" will be carried out in the following procedure.

Firstly, blue (B) pixels in the same plane (indicated by the red line in the figure) are averaged. Let Bave be the resultant average value. Then, white (W) pixels in the same plane (indicated by the red line in the figure) are averaged. Let Wave be the resultant average value. Since the change in luminance of white shows the substantially same tendency as that of color pixels in the same plane, by letting Wa be the W pixel value at the point A, the following equation is used to determine the value Ba of the B pixel to be used for interpolation on the point A.

$$Ba = (Wa/Wave) \times Bave$$

Those similar to the above procedure are successively applied to the other color pixels, that is, R and G pixels, so as to complement color pixels on the positions corresponding to all imaged pixels.

According to the above procedure, averaging is performed on color signals that have reduced sensitivity due to filters and hence are relatively noisy. The averaging can remove noise, such as random noise, and luminance values of the color pixels can be reproduced based on the change in luminance of the W pixels.

In the imaging device according to this embodiment of the invention, simple averaging can be applied to interpolation of W pixels with good S/N on a location where one of RGB pixels is present, resulting in simple circuit configuration. Furthermore, since the process is performed on raw data, the existing signal processing algorithm advantageously does not need to be changed. Moreover, in a dark portion of an image or a low-illuminance image, even when the image is processed such that high gain is applied to the sensor output, colors are reconstructed with reference to W (white) pixels having relatively low noise, allowing noise of the color image to be reduced to the level similar to that of the W (white) pixels. Furthermore, since a surface having the same luminance or the same tendency is detected and labeled, the resultant signal outputted along with the result of the process can be used in image processing in the following application.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a sensor having a cell layout having a plurality of chromatic color pixels and high-sensitivity pixels having higher sensitivity to incident light than the chromatic color pixels arranged in a checkerboard pattern;
   a white balance block that normalizes the pixel output from the sensor with respect to the chromatic color pixels or the high-sensitivity pixels;
   a pixel interpolation block that performs interpolation on the phase where a chromatic color pixel is present by interpolating the other lacking colors; and
   a noise reduction block that is situated between the white balance block and the pixel interpolation block, and performs interpolation on phases of the chromatic color pixels based on the signal component of the high-sensitivity pixels so as to suppress noise in the chromatic color pixels.

2. The imaging device according to claim 1, wherein the high-sensitivity pixels are white pixels or gray pixels.

3. The imaging device according to claim 1, further comprising an averaging block that is situated upstream of the noise reduction block and calculates the average of chromatic color pixels of the same color.

4. The imaging device according to claim 1, wherein the pixel interpolation block judges an area having the same tendency in terms of luminance with reference to the high-sensitivity pixels, and performs pixel interpolation in such a way that the values of the chromatic color pixels in the plane having the same tendency in terms of luminance are replaced with the respective chromatic color pixels.

5. The imaging device according to claim 1, wherein the pixel interpolation block comprising:
   a color separation block that performs color separation on the pixel signal after the white balance in such a way that the pixel signal is divided into respective chromatic color pixels and high-sensitivity pixels;

a correlation detection block that determines an area to which signal interpolation is applied based on the high-sensitivity pixel image resulting from the color separation and;

a high-sensitivity pixel interpolation block that interpolates high-sensitivity pixels on chromatic color pixels where no high-sensitivity pixel is present based on the result of the correlation detection;

a surface detection block that detects a surface having the same tendency in terms of luminance based on the result of interpolation of the high-sensitivity pixels and the result of the correlation detection; and a chromatic color pixel surface interpolation block that performs interpolation of color pixels on the detected surface basis.

\* \* \* \* \*